Figure 3:
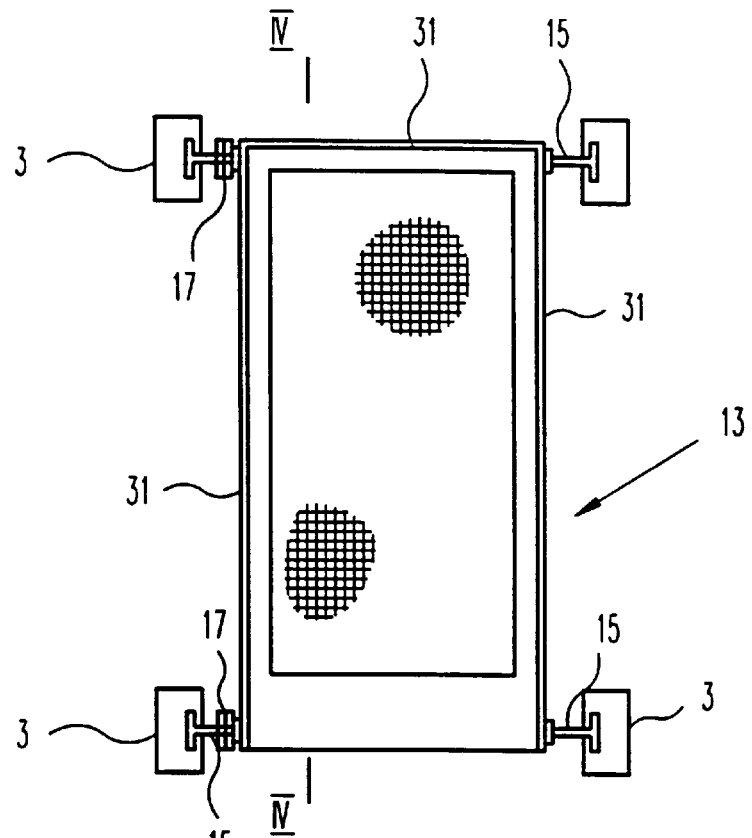

United States Patent [19]
Elimar

[11] Patent Number: 5,968,576
[45] Date of Patent: Oct. 19, 1999

[54] APPARATUS FOR THE FIXING OF PIECES OF MEAT AND A METHOD FOR USE OF THE APPARATUS

[75] Inventor: Kjeld Elimar, Aalborg, Denmark

[73] Assignee: SKF-Danfotech A/S, Denmark

[21] Appl. No.: 08/952,632

[22] PCT Filed: May 15, 1996

[86] PCT No.: PCT/DK96/00217

§ 371 Date: Feb. 5, 1998

§ 102(e) Date: Feb. 5, 1998

[87] PCT Pub. No.: WO96/36232

PCT Pub. Date: Nov. 21, 1996

[30] Foreign Application Priority Data

May 19, 1995 [DK] Denmark ................................ 0575/95

[51] Int. Cl.⁶ .............................. A01J 1/10; A23L 37/10; A47J 37/10; A22C 1/10
[52] U.S. Cl. ......................... 426/513; 426/315; 426/443; 99/349; 99/351
[58] Field of Search ............................ 110/194; 426/513, 426/315, 520, 524, 443, 465, 512; 99/349, 351, 467, 352, 353, 355, 356

[56] References Cited

U.S. PATENT DOCUMENTS

| | | |
|---|---|---|
| 3,750,563 | 8/1973 | Tonjum .................................. 100/194 |
| 3,897,573 | 7/1975 | Kelly ..................................... 426/272 |
| 3,910,141 | 10/1975 | Divam ...................................... 83/26 |
| 4,417,509 | 11/1983 | Deibel et al. ............................ 99/467 |

FOREIGN PATENT DOCUMENTS 456 070 A1  11/1991  European Pat. Off. .

*Primary Examiner*—David Lacey
*Assistant Examiner*—Drew Becker
*Attorney, Agent, or Firm*—Jones & Askew

[57] ABSTRACT

An apparatus and method for the fixing of pieces of meat under pressure during a smoking or heating process, comprising a number of perforated elements arranged as layers above one another, and where holding elements are mutually connected by links which permit mutual displacement to a maximum distance between the layers. On three sides between adjacent layers, the holding elements are provided with fixed, perforated walls, and from at least one holding element, preferably more, the walls extend from two opposing sides from the bottom of the holding element(s) down towards the underlying holding element, and from the upper side from the same holding element(s) the walls extend towards the overlying holding element. There is hereby created a chamber for the insertion of each individual piece of meat, which due to the perforations in the chamber walls not only permits an optimum smoking of the pieces of meat during the smoking process, but also ensures a well-demarcated insertion space for the meat. Furthermore, the system makes it possible for the insertion of the pieces of meat to be carried out mechanically.

7 Claims, 3 Drawing Sheets

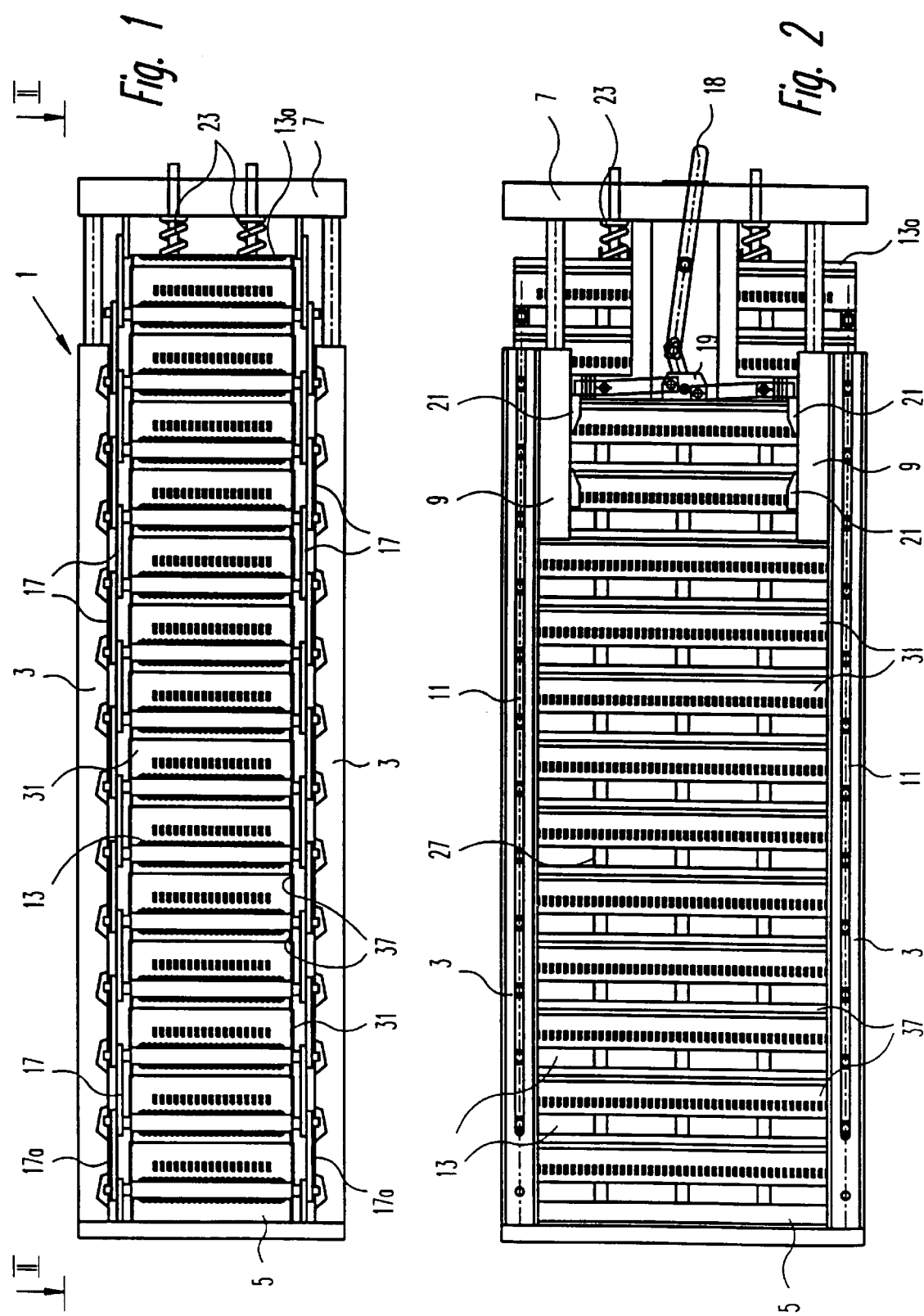

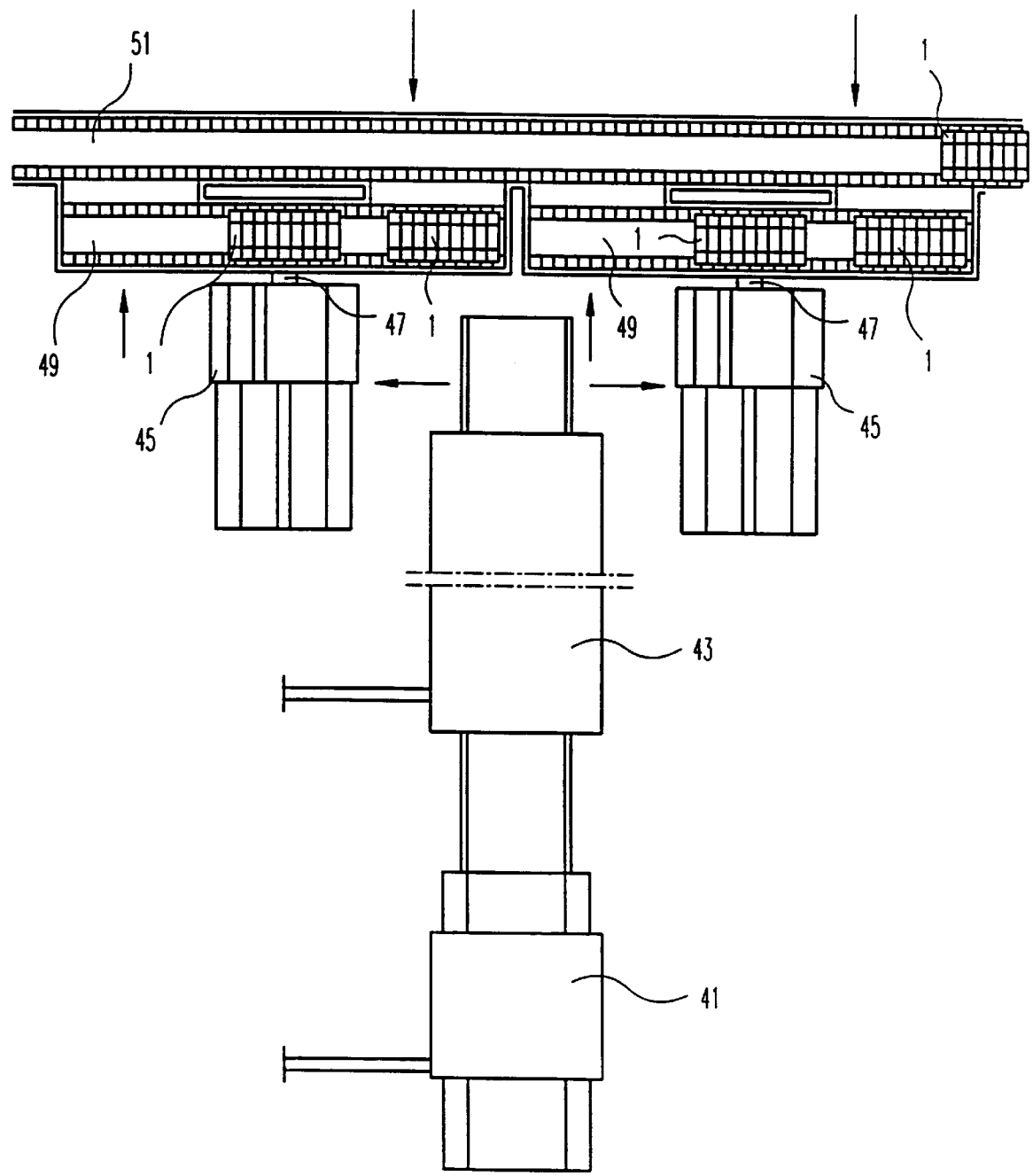

APPARATUS FOR THE FIXING OF PIECES OF MEAT AND A METHOD FOR USE OF THE APPARATUS

BACKGROUND OF THE INVENTION

The invention relates to an apparatus for the fixing of pieces of meat under pressure during a smoking or heating process, and comprising a series of perforated holding elements arranged as layers above one another. The holding elements are mutually connected by links which allow mutual displacement to a maximum distance between the layers.

The invention also relates to a method for use in the smoking of pieces of meat while using the apparatus.

Such an apparatus is described in U.S. Pat. Nos. 3,750, 563 and 3,473,465. The known types of apparatus have holding elements configured as flat shelves, where adjacent shelves are hinged to each other in a manner which, in addition to displacement towards and away from each other, also allows parallel displacement of the shelves. The known types of apparatus are configured with wire mesh or the like which allows smoke to pass between the pieces of meat which are fixed between the holding elements. With a known method exercised while using the known apparatus, the holding elements hang under one another, e.g. suspended from a frame or a hook, with the shelves at a maximum distance from each other. The meat products, e.g. hams, are there-after placed on the shelves, after which the apparatus is conveyed to a pressing station where, for example using compressed-air cylinders, the shelves are pressed around the hams. Finally, the apparatus is locked in the compressed position around the pieces of meat, and in this locked position the apparatus can be transported to the smoking or the boiling processes. After smoking and/or boiling, the layers can be released from one another and the pieces of meat can be removed.

With the known methods, the insertion and the removal of the pieces of meat has hitherto been carried out manually, and with the known apparatus for the fixing of the pieces of meat it is difficult or impossible to carry out the process mechanically. Moreover, the apparatus is unable to maintain the shape of the pieces of meat during the smoking process, the reason being that the meat products are free to expand parallel with the shelves.

ADVANTAGES OF THE INVENTION

The special feature of the apparatus according to the invention is that the holding elements are provided with perforated, fixed walls on three sides between adjacent layers, and that from at least one holding element, preferably more, the walls extend from two opposite sides from the bottom of the holding element(s) down towards the underlying holding element, and from the upper side from the same holding element(s) the walls extend towards the overlying holding element.

There is hereby created a chamber for the insertion of each individual piece of meat, which allows an optimum smoking of the pieces of meat during the smoking process due to the perforation of the walls of the chambers, and also ensures a well-defined space for the insertion of the meat.

Since the chambers are created by the walls from overlying holding elements forming a cooperating wall with the walls of the underlying holding element, this system provides good space during the insertion of the meat, and makes it subsequently possible to exercise a pressure whereby the dimensions of the chambers are changed/reduced, hereby shaping the pieces of meat.

When there are fixed walls on the holding elements to limit the space in which the pieces of meat can lie, a mechanical insertion of the pieces of meat in the apparatus can be utilized. It is thus sufficient to use a pressure to slide in the piece of meat, in that the wall which lies rearmost in the direction of the displacement can stop the piece of meat before it projects out over the edge. There is thus achieved a stable backstop when the pieces of meat are inserted, and herewith a uniform product. The perforations in the walls ensure that the smoke can penetrate in to the piece of meat.

The apparatus is moreover advantageous for use in the method according to the invention. When the processing of pre-shaped pieces of meats is involved, especially pieces of bacon, the walls function as a part of the fixture which holds the pieces of meat in shape during the whole of the process. Consequently, the breadth of the pieces of meat does not change after the subsequent heating during the smoking process, which would otherwise be the case with the known technique.

It is preferred to configure the apparatus with posts which are arranged as guides for the holding elements. It is particularly advantageous to configure the posts as hollow profiles with longitudinal slots into which pins from the holding elements extend. It is hereby possible to achieve control of the holding elements in relation to the posts and in relation to one another in at least one direction.

Moreover, it is preferred to configure the apparatus, where the walls which extend out on both sides of each holding element can pass on the inside or outside of the walls on the adjacent holding elements.

The walls hereby function as guides between adjacent holding elements which clamp around a piece of meat. A reliable positioning of the holding elements in relation to one another is achieved hereby, and herewith a more precise shape in which the piece of meat is fixed during the subsequent smoking and heat treatment. This embodiment will find particular application in the elimination of the degree of freedom which the holding elements will have if permitted by the pins in the slots.

In order to ensure a precise shape and to prevent squeezing of the outer part of the piece of meat in the compression of the shape, it is preferred to configure the walls such that the walls that extend on both sides of each holding element are of a height which differs from the adjacent walls of the adjacent element. Furthermore, the risk of the perforation in the one wall being covered by the other wall is eliminated.

With the method, where the apparatus when being filled with pieces of meat is brought into a position in which the holding elements form a substantially horizontal row, it will be possible to index the apparatus mechanically in relation to the discharge opening for the bacon press, whereby a precise and, from the handling point of view, a simple filling of the apparatus with pieces of bacon is achieved.

THE DRAWING

Figure 4:
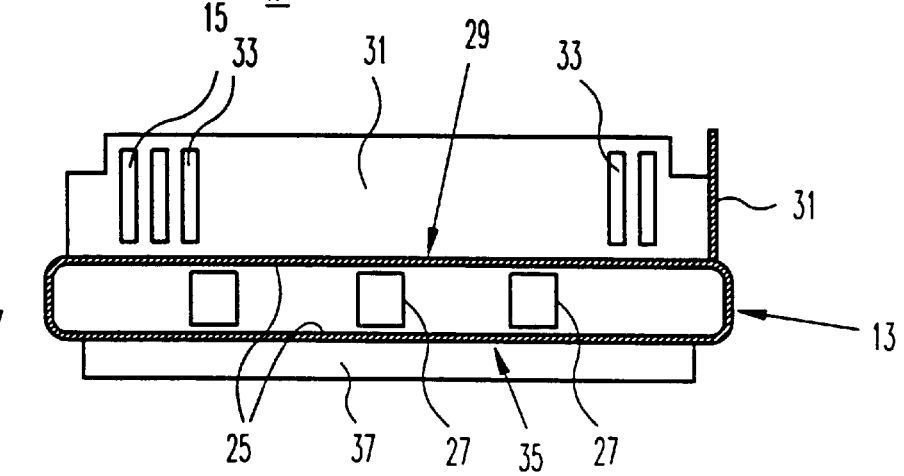
Figure 5:
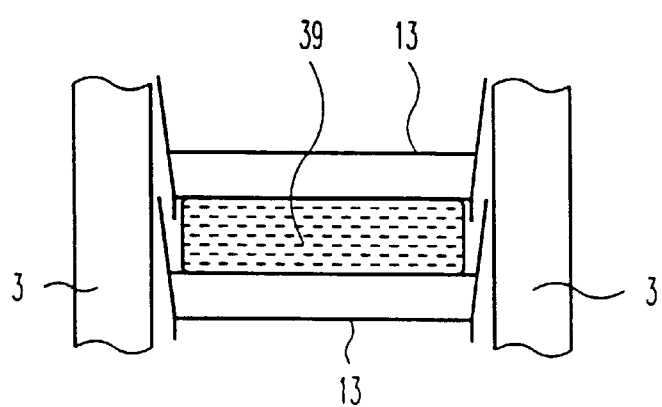

A preferred embodiment of the apparatus and the method according to the invention will now be described in more detail with reference to the drawing, where FIG. 1 shows a fixing apparatus for shaped pieces of bacon seen from the side of insertion, FIG. 2 shows the same as in FIG. 1 but seen along the line II—II, FIG. 3 shows a holding element for the apparatus seen from above, FIG. 4 shows the holding element in section along the line IV—IV in FIG. 3, FIG. 5 shows a piece of bacon clamped between two holding elements in the apparatus, and FIG. 6 shows a section of an apparatus for use in the implementation of the method.

DESCRIPTION OF THE EXAMPLE EMBODIMENTS

The apparatus 1 according to the invention has a frame consisting of four posts 3 which at the one end are secured to a baseframe 5, and at the other end are held together by a topframe 7 which, guided in the sleeves 9, can be displaced in the longitudinal direction of the posts.

Holding elements 13 with pins 15 are suspended between the posts 3 and displaceable in slots 11. The pins 15 extend from opposite sides of the rectangular holding elements 13, and at the same time serve as securing points for links 17 which connect all of the elements 13 in pairs with one another and with the topframe 7. The lowermost link 17a is secured to the baseframe 5.

The links 17 are configured in a known manner with a circular hole in the one end and an elongated hole in the other, whereby the pin 15 placed in the elongated hole is given a certain degree of movability in relation to the link 17. All of the layers, which are formed by the holding elements 13, can hereby be mutually displaced by moving the topframe 7. As shown in FIG. 2, a handle 18 can be used to operate a Pasquil locking arrangement 19 cooperating with cams 21 so that the holding elements 13 can be held in the extended position (as shown in the drawing) or in a compressed position. Locking mechanisms other than the Pasquil arrangement can naturally be used within the framework of the invention. Upon compression, springs 23 transfer the pressure from the topframe 7 to the nearest holding element 13a and allow a certain dimension tolerance in the distance between adjacent layers in the compressed position, which is of significance for compensation for shrinkage during the subsequent heating process.

Like the known shelf-formed arrangements in U.S. Pat. No. 3,750,563, each of the holding elements comprises two parallel surfaces 25 of wire mesh. According to a preferred embodiment of the invention, spacing elements in the form of U-profiles 27 are disposed between the surfaces 25 in order to allow the passage of air, while at the same time the pressure forces can be transferred through the holding elements 13.

At its one surface 29, the holding element 13 is framed along three side edges by the walls 31, which are higher than the thickness of the shaped meat product which is to be fixed in the apparatus. The walls 31 are perforated with elongated holes 33. One of the sides forms a wall edge which is in firm connection with the holding element, whereby a stable backstop is achieved upon insertion of the pieces of meat. At its other surface 35, the element 13 opposite and facing away from the walls 31 is provided with two parallel walls 37 which are considerably lower than the walls 31. Moreover, the walls 37 are disposed with slightly less mutual distance than the walls 31, so that the walls 31 and 37 cannot abut against each other upon compression of the elements 13, but instead serve as lateral guides between the elements 13.

Other embodiments of the walls 31, 37 are possible within the spirit of the invention. For example, the walls 31 and 37 can be of the same height and all be perforated. Moreover, there can be a third wall corresponding to the two shown 37, i.e. opposite the centremost of the walls 31.

Since the space between two adjacent elements' opposing surfaces 29 and 35 is enclosed on only three sides by the walls 31,37, the fourth side will provide access for the insertion of the pieces of meat 39. In FIG. 1 the apparatus 1 is seen from the side of insertion with the holding elements in the separated state without meat pieces, while FIG. 5 shows two holding elements which clamp around a piece of bacon 39.

The apparatus 1 can be used in the smoking process for pieces of bacon, where after being cut up and before heat treatment the bacon is injected with a multi-injector apparatus 41 with brine cooled down to, for example, −8° C., cf. FIG. 6. The cooling-down can also be effected using, for example, nitrogen or carbon-dioxide. Thereafter, a surface salting is carried out, similarly with cooled brine, in a shower tunnel or a salt-bath 43. The pieces of bacon 39, which now have a temperature of around −7° C., are hereafter transferred for shaping under high pressure into rectangular pieces in bacon pressers 45, which provides optimum yield when the pieces 39 are to be cut into slices before sale to consumers. By the shaping of the pieces 39 at the low temperature, it is ensured that the fibres in the meat can be moved so that plastic shaping of the meat can be effected.

At the discharge openings 47 of the bacon pressers 45, there is a conveyor 49 which can feed the holding apparatus 1 in the lying position as shown in FIGS. 1 and 6 past the discharge opening 47. With suitable and in themselves known means of control, the feeding can take place so that the insertion openings between the holding elements 13 are alternately indexed to stand opposite the opening 47. The apparatus 1 can hereby be filled when the elements 13 are drawn away from one another. Because of the walls 31, the maximum filling will be able to be carried out without positioning problems. After having been filled, the apparatus 1 is pushed over onto a main conveyor 51 to a pressing station, where in a known manner the elements 13 are compressed around the still frozen pices of bacon 39, cf. FIG. 5. In the subsequent draining and smoking process under higher temperatures from 50 to 70° C., the bacon will be held in that shape which it has been given in the press 45. The boiling shrinkage will be transferred to the product's thickness.

After the smoking process, the apparatus 1 can be opened, whereby the pieces 39 are loosened, and the pieces 39 can be removed from the apparatus 1 with a fork-shaped gripping element. Hereafter, the apparatus 1 can be washed and dried before being used again.

After heat treatment and because of the fixing of the pieces in the apparatus 1, the bacon pieces 39 will retain the cross-section which they have been given in the press 45, which is the ideal cross-section for further processing and sale.

Other kinds of meat or meat products, where automatic handling and/or fixing of the meat pieces is desired during different forms of processing, e.g. boiling, can naturally be handled with the apparatus within the spirit of the invention.

I claim:

1. Apparatus for the fixing of pieces of meat under pressure during a smoking or heating process, comprising:
    a number of perforated holding elements arranged as layers above one another;
    the perforated holding elements mutually connected with links which permit mutual displacement to a maximum distance between the layers;
    the perforated holding elements having three sides between adjacent layers with fixed, perforated walls, and a fourth side being open to admit pieces of meat to the perforated holding element, and from the perforated holding elements, the fixed perforated walls extend from two opposing sides from the bottom of the perforated holding elements down towards an underlying perforated holding element, and from the upper side of the same perforated holding elements the fixed perforated walls extend towards an overlying perforated holding element;

thereby creating between adjacent perforated holding elements a chamber for insertion of a piece of meat in a predetermined direction so that one of the extending fixed perforated walls act as a backstop to prevent the piece of meat from projecting outwardly beyond the perforated holding element.

2. Apparatus according to claim 1, characterized in that the apparatus comprises a frame with posts which are arranged to function as guides for the perforated holding elements in the direction of displacement.

3. Apparatus according to claim 2, characterized in that the posts consist of hollow profiles and have longitudinal slots with which pins projecting from the perforated holding elements are in engagement.

4. Apparatus according to claim 1, characterized in that the fixed perforated walls which extend on both sides of each perforated holding element can pass inside or outside the fixed perforated walls on the adjacent perforated holding elements.

5. Apparatus according to claim 4, characterized in that the fixed perforated walls which extend on both sides of each perforated holding element are of a height which differs from the adjacent fixed perforated walls of the adjacent perforated holding element.

6. Method of using an apparatus for smoking pieces of meat, said apparatus comprising a number of perforated holding elements arranged as layers above one another, and where the perforated holding elements are mutually connected by links which permit mutual displacement to a maximum distance between the layers, the method comprising the steps of:

providing the perforated holding elements with fixed perforated walls on three sides between adjacent layers;

forming on a fourth side of each perforated holding element an opening where the layers are separated and held fixed at a maximum from one another; and then filling the apparatus with pieces of meat between the layers by leading the openings alternately past a discharge opening from a bacon press feeding in, between the perforated holding elements, pieces of meat and using one of the fixed perforated walls as a backstop to prevent a piece of meat from projecting outwardly beyond the perforated holding element;

compressing the perforated holding elements around the pieces of meat and fixing the perforated holding elements in the compressed state before commencing the smoking; and then smoking said pieces of meat.

7. Method according to claim 6, characterized in that during the filling with pieces of meat the apparatus is brought into a position in which the perforated holding elements form a substantially horizontal row.

* * * * *